Figure 1:
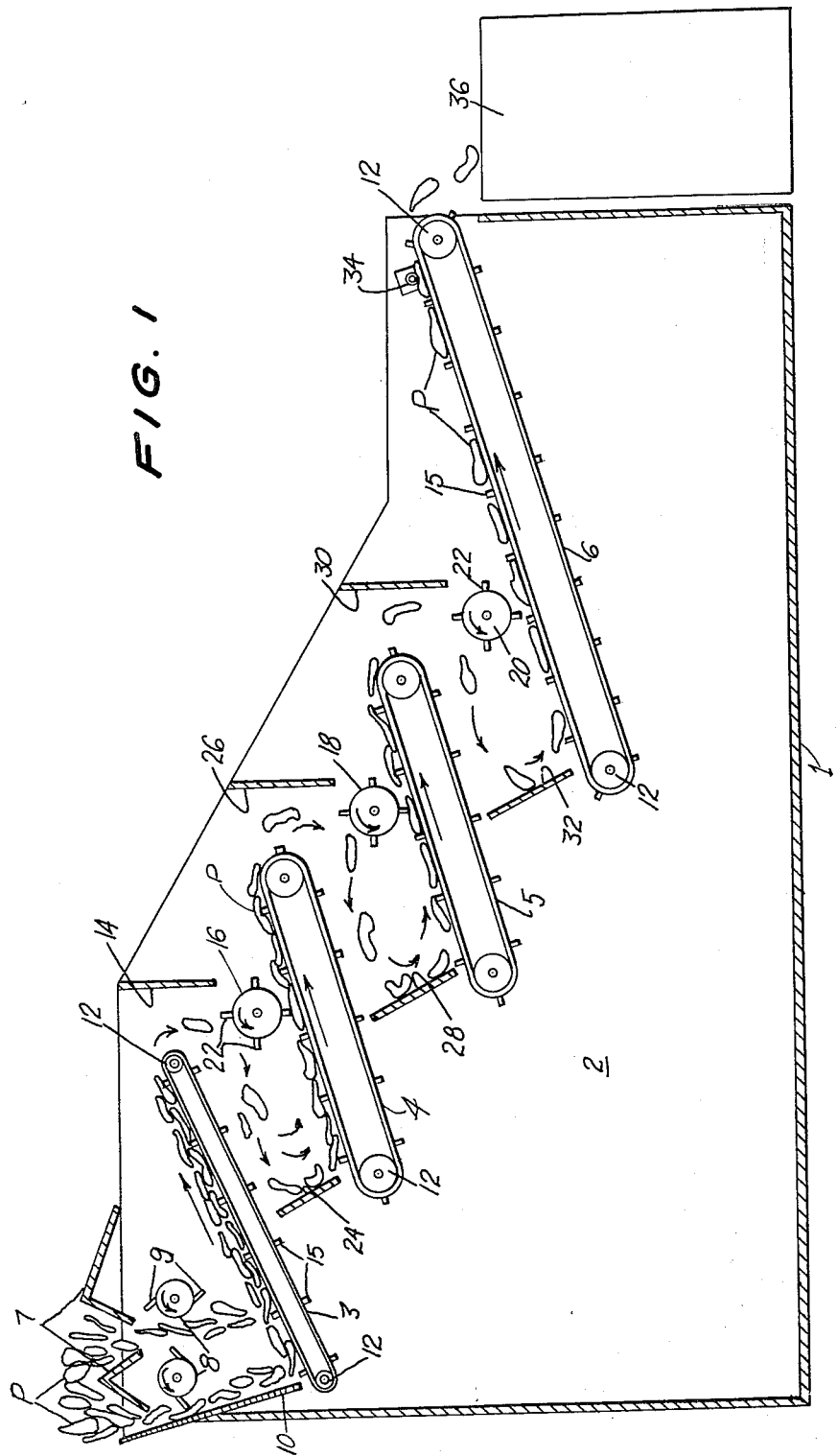

May 25, 1965  H. KOPLIN  3,185,286
PIECE SEPARATOR AND COUNTER
Filed March 29, 1963  2 Sheets-Sheet 1

United States Patent Office 3,185,286
Patented May 25, 1965

3,185,286
PIECE SEPARATOR AND COUNTER
Harry Koplin, Glencoe, Ill., assignor, by mesne assignments, to Hydraxtor Company, Chicago, Ill., a corporation of Illinois
Filed Mar. 29, 1963, Ser. No. 269,031
11 Claims. (Cl. 198—76)

The present application includes the disclosure of application Ser. No. 192,255 filed May 3, 1962, entitled "Piece Separator and Counter," now abandoned, and in part is therefore a continuation of that earlier application.

This invention relates to apparatus for handling items such as loose fabric articles or pieces, for separating individual items from a random collection or jumble of same and for counting or inspecting the individual items thus separated. More particularly this kind of equipment is useful in laundries, dry cleaning establishments and the like, to receive bulk linens or other items, to isolate the items one from another and thereafter to move the separated items one at a time past a tallying station.

Machinery of this character, in order to be commercially acceptable, must be simple in construction, dependable in operation and must separate the individual pieces from a pile automatically without damage to the pieces, surely spacing and transporting them on a conveyor or other carrier one at a time so that their separateness may be recognized by an automatic counting mechanism with only superficial handling, observing or judging by any person. Accordingly, the object of this invention is to provide an automatic piece separating and counting machine of the character and qualities above specified.

In carrying out the objects of this invention, in one embodiment thereof a series of generally horizontal conveyors is provided, one conveyor located below the preceding one so that as items reach the end of one conveyor they drop toward the next, each succeeding conveyor being driven more rapidly than the preceding one to aid in separating and spacing the items. However, instead of dropping items directly from one conveyor to the next, it is preferred to provide a kicker element in the path of free fall of the items and this kicker tosses or throws the items as they are dropped from the end of one conveyor preferably in an abrupt reversal of direction but toward the beginning of the next conveyor, thereby urging the items further to separate one from another before they reach the next conveyor. Also, each kicker element may be located closely enough to the conveyor over which it operates so as further to separate items passing under the kicker on the conveyor. Preferably each succeeding kicker is driven more rapidly than the preceding kicker in the same fashion that the conveyors are driven at successively increasing speeds. After the originally jumbled items have passed over several sets of conveyors and kickers the items will be completely separated and spaced so that a photoelectric counter or other registering or indicating device near the end of the last conveyor can accurately tally the individual pieces or items before they proceed to subsequent washing or cleansing operations.

Other objects and further details of that which is believed to be novel and included in this invention will be clear from the following description and claims, taken with the accompanying drawings in which are illustrated two examples of apparatus embodying the present invention and incorporating the series of increasing speed conveyors and kickers above mentioned.

Figure 2:
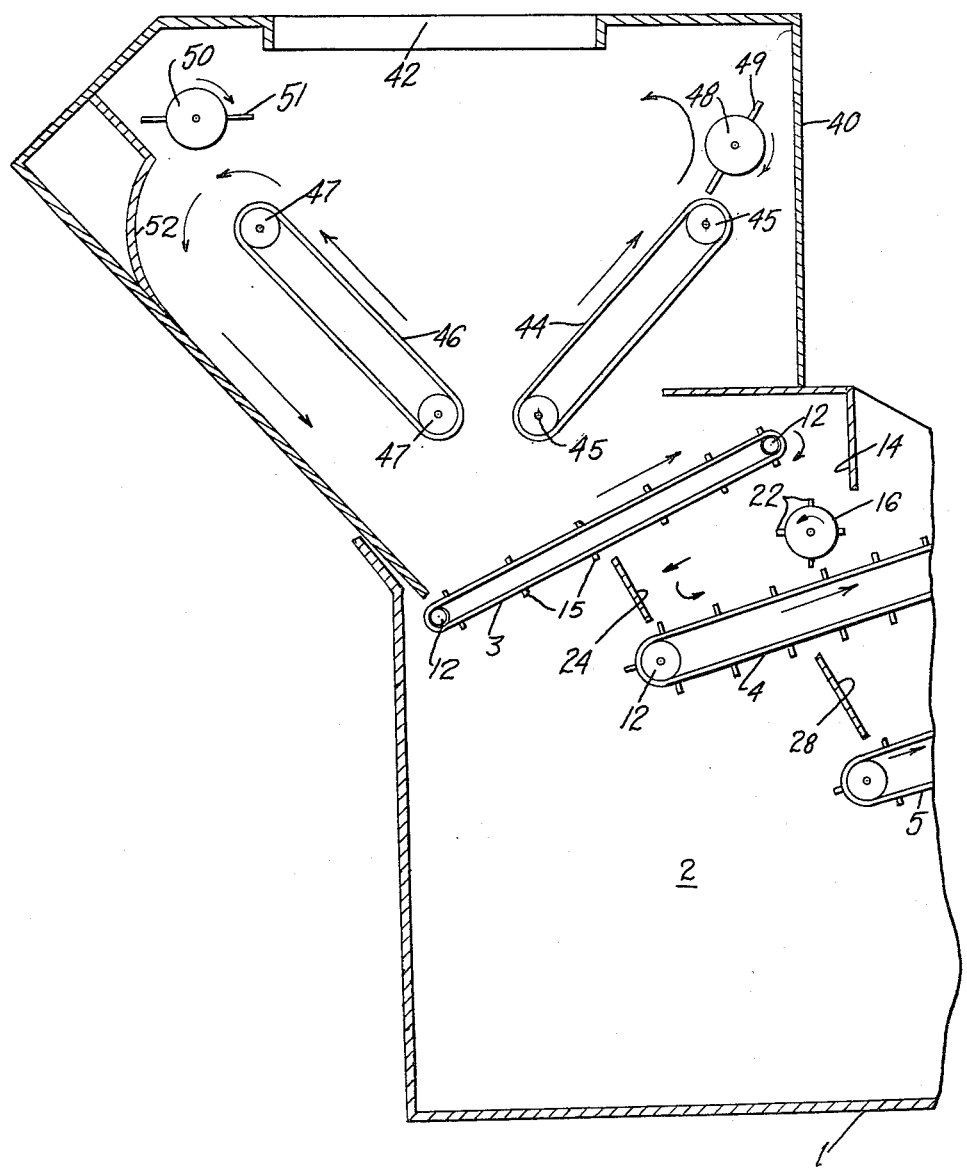

FIG. 1 in the drawings is a phantom side view, being a vertical longitudinal section showing the principal parts of an exemplary piece separating and counting machine, and FIG. 2 is a similar sectional view of one end of the exemplary machine but showing a modified form of hopper for the reception, preliminary separation and feeding of pieces to the separating apparatus proper.

Because the particular details of the machine design may be altered to suit individual tastes, space requirements and special circumstances of use, only the essential elements required in the apparatus are illustrated. Furthermore, because the drives for the various conveyors and kickers may be accomplished by individual motors or by interconnected chains, gears or pulleys, no drive mechanisms are shown, although as will later appear, the relative speeds and directions of drive of various elements are significant in this invention.

In the exemplary machine a housing or casing 1, which includes suitable supporting framework (not shown), encloses and carries all of the other parts of the machine. This housing is open at its top so that the mechanisms therein and the items passing therethrough are readily available for inspection, correction, or adjustment. If desired, hinged or removable sectional covers for the open top may be provided. Side walls 2 on the housing carry between them a stepped series of driven piece separating and spacing conveyors shown as recirculating belts 3, 4, 5, and 6.

Above the first conveyor belt 3 a bulk feeding device is arranged, and this may take the form of a pair of spaced angular deflectors 7 serving as a double chute or hopper to provide a divided feed for a jumbled mass of similar articles introduced by hand or by conveyor into the machine. The items, articles or pieces which are to be separated are designated by the letter P throughout the drawing. Bulk linens, such as soiled towels, are typical of articles to be handled by the machine.

Under these feed hopper deflectors are a pair of substantially identical feed rotors or cylinders 8, both of which are driven at the same rate of speed and in the same direction as indicated by the arrows. These feed rotors have opposed outwardly extending flexible fingers or fins 9 on their peripheries which, as the feed rotors move, strike against the pieces coming from the two hopper openings and help unscramble them and toss them toward the beginning or downhill side of the first conveyor belt 3. The rotors 8 may be regarded as kicker elements. A somewhat slanted guiding wall or chute 10 under the feeding device directs the pieces to the beginning of the first belt and serves as a "backstop" for pieces tossed in that direction by the rotors 8.

FIG. 2 shows another preferred form of hopper or bulk feeding device to introduce pieces to the starting end of separating conveyor 3. Improved efficiency may be obtained by using this form of hopper rather than the form shown in FIG. 1. The same reference numerals are used where the parts of the apparatus are the same.

This improved hopper includes an outer casing or housing 40, supported above the main housing 1, with a feed opening 42 therein for receiving bulk goods to be separated. The pieces drop into the V formed by opposed angularly arranged piece feeding belts 44 and 46, belt 44 being driven at about twice the speed of belt 46 and in the opposite direction, both belts traveling upwardly, away from the bottom of the V. These belts are mounted on and driven by pulleys or rolls 45 and 47 respectively and the angles of the belts, singly or with respect to each other, may be adjusted for optimum results by changing the relative positions of the pulleys that carry and drive them.

Both belts 44 and 46 are roughened or serrated on their outer surfaces so that each will tend to pick up and carry pieces dropping against it but without catching on the pieces sufficiently to pull and tear them. Because of the different speeds of travel of these belts, the pieces will receive an initial separation, high-speed belt 44 taking away the excess of goods that can not be handled by low-speed belt 46.

At the upper end of belt 44, a rotor-kicker 48 is arranged, this rotor carrying paddles or fins 49 which knock goods from the upper end of the belt and throw them upwardly back toward belt 46 and the bottom of the V. This rotor must travel at such a speed that no pieces will fall underneath the belt 44 but all will be directed back at least to the center of the hopper where belt 46 can pick them up.

At the upper end of the slower feed belt 46 a feed rotor 50, with kicker paddles or fins 51, is arranged to pull or knock goods off from the belt end and throw them downwardly onto a slanted slide 52, leading under the belt 46 to the starting or downhill end of the first separator conveyor 3 in the piece separating apparatus proper.

This improved hopper arrangement is designed to prevent jamming of the machine by large masses of pieces dumped into it or piling up at any time. It may also make one or two of the final conveyors in the separator unnecessary because more of the piece separation is carried out in and by the hopper. The opposite direction of movement of the feeding belts tends to separate the pieces and the higher speed of belt 44 keeps most of the load on the side away from the feeding belt 46, although the rotor-kicker 48 repeatedly drops pieces back to the downhill side of the belt 46 where they can be picked up and fed ultimately by gravity on the surface of slide 52 to the separating mechanism. Under heavy loading of the hopper, most of the pieces will be recirculated until belt 46 can feed them in partly separated condition to the chute 52 and thence to the piece separating apparatus.

Although all of the piece separating belts extend generally horizontally, it is preferred that they be tilted to run slightly uphill at an angle of between 15 and 20 degrees. However, if an uphill angle is used, it should not be too steep because any tendency of the pieces to roll or slide downhill on the belt must be overcome ultimately by the forward movement of the belt. Conveyor belt 3, as well as the other belts, is suitably supported and driven as by pulleys or rolls 12, one of which is rotatably driven in a direction to move the belt and carry pieces on the belt from a starting end under the feeding device to a discharge end from which the pieces on the belt are ejected or dropped. At this discharge end of the conveyor 3 a vertical deflector wall 14 is provided between the side walls of the housing and it directs pieces downwardly as they leave belt 3. Excessive backward rolling or sliding of articles on the belt as it moves forward is prevented by grippers 15, shown here as transversely extending ridges or bars spaced equally along the entire periphery of each of the belts.

As pieces drop from the end of conveyor belt 3 they will fall against the first of a series of piece separating separating kicker elements, shown as the rotors 16, 18 and 20. The construction and operation of each of these rotors is similar so that description of one will suffice for the rest. The rotor 16 is provided on its periphery with a series of radially extending flexible kicker fins or fingers 22, and as the pieces fall against the rotor the kickers toss the pieces in an abrupt change of direction of movement toward a backstop 24 arranged just above the lower or starting end of the conveyor belt 4. In order to have this action, the rotor 16 should be traveling at a peripheral speed greater than the linear speed of the preceding belt 3 and the rotary drive for the rotor 16 is accordingly so arranged.

After striking the backstop 24, the items fall to conveyor belt 4 and are carried upwardly again under the flexible kickers 22 on rotor 16 which now may act by engaging and moving against the upper surfaces of pieces on the belt to help unscramble or separate them further. Beyond the rotor 16 the articles on belt 4 will travel until they reach the upper end of that belt at which point they are discharged toward a deflector 26 and drop against the rotor 18 whose kickers toss the pieces to a backstop 28 arranged above the beginning of belt 5. At the other end of belt 5 is a discharge deflector 30 arranged above the rotor 20, from which articles are tossed against another backstop 32 and fall against the beginning of the final delivery belt conveyor 6. As in the case of the previous conveyor belts after the first one, pieces on the discharge belt 6 are carried under the rotor 20 and proceed to the end where they are dropped off. However, near the end of this delivery belt there is provided an automatic counting device 34 which senses separated and spaced individual articles on the belt as they pass the device and, by suitable recording or indicating mechanisms, counts or tallies the individual items just before they leave the machine. The device 34 may be a photoelectric counter or other item sensing device of suitable character. A storage bin or basket 36 may be provided at the end of the machine to collect the separated and counted soiled pieces of work for subsequent operations thereon.

There are two main functions performed by this machine. The first of these is the unscrambling or separation of individual articles from a jumble or pile of the same so that each article is individual distinct from the other articles. When once the articles have been separated, the separate articles must be spaced one from another sufficiently and transported so that automatic tallying or counting may be accomplished. Separation of the articles is done principally by allowing them to fall freely against the kicker elements, and by changing the direction of free fall abruptly by the kicking or tossing action of these elements. Thereafter the pieces strike against a backstop, falling again to the next conveyor. These repeated free falls, abrupt changes of direction and further free falls act to unsnarl or untangle the articles from each other. The articles, as they are progressively separated, are spaced further and further apart from one another by reason of the fact that each conveyor is driven progressively at a linear speed higher than that of the immediately preceding conveyor, belt 4 travelling faster than 3, belt 5 travelling faster than 4, and belt 6 travelling faster than any of the other belts. The separating and spacing action is sufficient so that the individual articles will be carried past the counting device 34 by belt 6 one at a time with sufficient spacing between the articles so that proper automatic counting is made.

The hopper in the form of the invention shown in FIG. 2 is really an extension of the piece-separator that follows it. Therefore the slow-moving belt 46 acts as another conveyor similar to the progressively faster conveyors 3, 4, 5 and 6, and, in the manner of those conveyors, belt 46 should have a linear drive speed somewhat less than that of the first conveyor belt 3 which follows it. The speed of belt 46 may be made considerably less than that of conveyor 3, assuming that there may be some dropping of single loose pieces from the hopper directly through the opening in the bottom of the V between the belts and onto conveyor 3 near its downhill or starting end. If no opening is here desired, the bottom belt pulleys 45 and 47 may be located closer together or an angled deflector (not shown) may be used to close the opening and to direct pieces toward one or the other of the belts 44 and 46.

As with the belt drives, the revolutions per minute of the successive kicker rotors 16, 18 and 20 may be and preferably is progressively greater from roll to roll and the peripheral speed of each rotor is preferably at least equal to or greater than the linear speed of the conveyor belt below it. This insures that the speeds of rotor and conveyor are comparable and there will be no jamming or binding between rotor and belt, as articles pass therebetween.

In the preferred hopper of FIG. 2, rotor-kickers 48 and 50 are driven at peripheral speeds greater than the linear speeds of the respective feeding belts 44 and 46 which carry pieces toward them. Thus these rotors give abrupt changes of direction of movement to pieces brought against them, acting in a manner similar to that of the kickers 16, 18 and 20.

Although three piece-separating and spacing kickers and conveyors are shown in the exemplary machine following the initial or feeding belt 3, the sets of kicker rotors and conveyor belts may be repeated as many times as is necessary to separate and space the articles sufficiently for an accurate automatic count. The number and size of rotor and belt conveyor sets required may depend upon the character of the towels, linens or other pieces being handled, and may vary because of differences in weight of the articles, their size, surface textures and other factors. Furthermore, although there must be an increasing differential of speed between the drives for successive conveyor belts, and preferably for the rotors, no absolute values can be given, again because of differences in the nature of the pieces being handled.

As an example of speed differentials which have been found effective in one machine according to the invention, a linear speed of 300 inches per minute for the final or delivery conveyor has been used, the preceding conveyors being driven at progressively slower rates in incremental steps of about 50 inches per minute; the next to the last at 250 inches per minute, the one before that at 200 inches per minute, and so forth. However, the invention should not be considered as limited to those speeds or these differentials in speed.

One satisfactory drive arrangement would be to have all the belts and the rotors driven from a single power source with preselected differentials of speed in the driving train between the drives for the individual elements. With this sort of arrangement the main drive could be speeded up or slowed down at will to take care of different average characteristics of pieces passing through the machine, the proportional differentials in speed between the driven elements being maintained no matter what the regulated main drive speed. Separate multi-speed controlled drives for each of the elements could also be used, but this might prove expensive.

Although in the preferred arrangement shown and described above, the various conveyor belts all move in the same direction and the rotors are all driven with their top surfaces moving in a direction opposite the direction of movement of the belts above them, much the same effect might be obtained by staggering the belts and driving alternate belts in the series in opposite directions. In that case, the rotor above each belt would be driven with its top surface moving in the same direction as that of the preceding belt so that its bottom surface would proceed in the same direction as the belt under it.

As will be evident from the foregoing description, certain aspects of this invention are not limited to the particular details set forth as examples, and it is contemplated that various and other modifications and applications of the invention will occur to those skilled in the art. It is therefore intended that the appended claims shall cover such modifications and applications as do not depart from the true spirit and scope of the invention.

What is claimed as new and is desired to be secured by Letters Patent of the United States is:

1. Apparatus for separating a jumble of pieces of the character described and transporting them in spaced relation from each other, comprising
    a first conveyor adapted to receive pieces at a starting end, carry said pieces and drop them at a discharge end,
    means driving said first conveyor at a given linear speed to carry pieces from said starting to said discharge end,
    a series of additional conveyors located successively one below another under said first conveyor,
    each conveyor in the series adapted to receive pieces at a starting end, carry said pieces and drop them at a discharge end,
    means driving each successive conveyor at a linear speed progressively greater than that of the preceding conveyor to carry pieces from said starting to said discharge end,
    a series of kicker elements, one above each of said series of additional conveyors, each located in the path of pieces dropped from the preceding conveyor,
    means driving each successive kicker element at a speed greater than the linear speed of the conveyor preceding it,
    each of said kickers, as driven, adapted to engage pieces dropped thereagainst from the preceding conveyor and to throw such pieces toward the starting end of the conveyor below it,
    whereby the repeated dropping of pieces from a conveyor to a kicker and throwing of pieces by the kicker to a next conveyor tends to separate the pieces and the progressively greater speed of the successive conveyors spaces the pieces accordingly and said pieces are transported in spaced relation from each other on the last of said series of additional conveyors.

2. Apparatus as claimed in claim 1 including
    a feeding device above said first conveyor,
    means driving said feeding device and
    said feeding device, as driven, adapted to engage pieces dropped thereagainst and throw such pieces toward the starting end of said first conveyor.

3. Apparatus as claimed in claim 1 including
    a counting device adjacent to the discharge end of the last conveyor in said series, adapted to count individual separated and spaced pieces as they are transported past said device.

4. Apparatus as claimed in claim 1 comprising, in addition,
    backstops extending above the starting ends of said series of additional conveyors, adapted to receive pieces thrown by said kicker elements and guide such pieces to the starting ends of said series of conveyors.

5. Apparatus for separating a jumble of pieces of the character described and spacing them from each other, comprising
    a generally horizontally extending first conveyor belt adapted to receive pieces at a starting end, carry said pieces substantially horizontally and drop them at a discharge end,
    means driving said first conveyor belt continuously at a given linear speed to carry pieces from said starting to said discharge end,
    a series of additional generally horizontally extending conveyor belts located successively one below another in stepped relation under said first belt,
    each belt in the series adapted to receive pieces at a starting end, carry said pieces substantially horizontally and drop them at a discharge end,
    means driving each successive conveyor belt continuously at a linear speed progressively greater than that of the preceding belt to carry pieces from said starting to said discharge end,
    a series of piece separating kicker rotors, one above each of said series of additional conveyor belts, each located in the path of pieces dropped from the preceding conveyor belt,
    means driving each successive rotor continuously at a peripheral speed greater than the linear speed of the conveyor belt preceding it and at a speed comparable to that of the belt below it, and
    kickers projecting from each of said rotors adapted to engage pieces dropped thereagainst and to throw such pieces toward the starting end of the conveyor belt below it as the rotor is driven.

6. Apparatus as claimed in claim 5 in which each of said conveyor belts is slanted uphill from its starting end to its discharge end at an angle from the hoizontal not exceeding 20 degrees.

7. Apparatus as claimed in claim 5 comprising, in addition,
piece deflectors extending vertically beyond the discharge ends of conveyor belts above each of the series of said kicker rotors, adapted to guide pieces dropping from the ends of said belts against the rotors, and
backstops extending above the starting ends of said series of additional conveyor belts, adapted to receive pieces thrown by said kicker rotors and guide such pieces to the starting ends of said series of belts.

8. Apparatus as claimed in claim 5 in which
each said kicker rotor is so closely located with respect to the conveyor belt immediately under it that
said projecting kickers on the rotor engage against and tend to separate pieces carried by said belt.

9. Apparatus as claimed in claim 1 including
a piece-feeding hopper above said first conveyor in said apparatus comprising
a first angularly arranged and upwardly driven feeding belt above said first conveyor,
a second upwardly driven feeding belt arranged to form a V with respect to said first feeding belt for receiving pieces dropped thereagainst between the belts,
said first belt being driven at a linear speed substantially greater than that of said second belt, said second belt being driven at a linear speed lower than the said speed of said first conveyor in said apparatus,
a first kicker element at the top of said first belt adapted to throw pieces from said belt toward said second belt and the center of the V between the belts,
a second kicker element at the top of said second belt adapted to pull pieces from said belt and direct them downwardly, and
a slide below said second kicker element adapted to receive pieces therefrom and from the end of said second belt and direct such pieces toward the starting end of said first conveyor in said apparatus.

10. A hopper for receiving a jumble of pieces of the character described and for feeding them to a piece separator, said hopper comprising
a first angularly arranged and upwardly driven feeding belt above said piece separator,
a second upwardly driven feeding belt arranged to form a V with respect to said first feeding belt for receiving pieces dropped thereagainst between the belts,
said first belt being driven at a speed substantially faster than that of said second belt,
a first rotary kicker element at the top of said first belt adapted to direct pieces upwardly from said belt toward said second belt and the center of the V between the belts,
a second rotary kicker element at the top of said second belt adapted to direct pieces downwardly from said second belt, and
a slide surface below said second kicker element adapted to receive pieces therefrom and from said second belt and direct such pieces under said second belt and toward said piece separator by gravity.

11. A hopper for receiving pieces of the character described and for feeding them to a conveyor, said hopper comprising
a first angularly arranged and driven feeding belt adjacent said conveyor,
a second driven feeding belt angularly arranged to form a V with respect to said first feeding belt for receiving pieces dropped thereagainst between the belts,
said belts being driven upwardly and in opposite directions away from the center of the V,
said first belt being driven at a speed substantially faster than that of said second belt,
a kicker element at the upper end of said first belt adapted to throw pieces from said belt toward the center of the V between the belts and toward said second belt, and
means at the upper end of said second belt adapted to receive and direct pieces from said belt, including
a slanted slide below said upper end of the second belt positioned to receive pieces therefrom and direct such pieces to said conveyor.

References Cited by the Examiner
UNITED STATES PATENTS

| | | | |
|---|---|---|---|
| 1,077,162 | 10/13 | Rodakowski | 198—76 |
| 1,457,352 | 6/23 | Dreher | 198—76 |
| 1,891,782 | 12/32 | Sager | 38—143 |
| 2,506,476 | 5/50 | Troy | 38—143 X |
| 2,666,271 | 1/54 | Mann | 38—143 X |
| 2,677,900 | 5/54 | Mann | 34—225 |

SAMUEL F. COLEMAN, *Primary Examiner*.

WILLIAM B. LA BORDE, *Examiner*.